(12) United States Patent
Kilian et al.

(10) Patent No.: US 8,554,966 B2
(45) Date of Patent: Oct. 8, 2013

(54) METHOD FOR DATA EXCHANGE

(75) Inventors: Markus Kilian, Merzhausen (DE); Andrea Seger, Zell i.W. (DE); Bert Von Stein, Zell i.W. (DE); Christian Wandrei, Weil am Rhein (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 163 days.

(21) Appl. No.: 13/080,698

(22) Filed: Apr. 6, 2011

(65) Prior Publication Data

US 2011/0252169 A1 Oct. 13, 2011

(30) Foreign Application Priority Data

Apr. 8, 2010 (DE) .................. 10 2010 003 741

(51) Int. Cl.
*G06F 13/42* (2006.01)
*G06F 13/38* (2006.01)

(52) U.S. Cl.
CPC ................... *G06F 13/385* (2013.01)
USPC ........................................... 710/58; 710/105

(58) Field of Classification Search
USPC ........................................... 710/105
See application file for complete search history.

(56) References Cited

U.S. PATENT DOCUMENTS

| | | | |
|---|---|---|---|
| 6,985,831 B2 * | 1/2006 | Ito et al. ................ | 702/188 |
| 7,167,762 B2 * | 1/2007 | Glanzer et al. ................ | 700/79 |
| 7,697,538 B2 * | 4/2010 | Buettner et al. ............ | 370/394 |
| 8,160,104 B2 * | 4/2012 | Simmons et al. ............ | 370/474 |
| 2003/0154056 A1 * | 8/2003 | Ito et al. ................ | 702/188 |
| 2006/0052985 A1 * | 3/2006 | Ito et al. ................ | 702/188 |
| 2006/0101111 A1 * | 5/2006 | Bouse et al. ................ | 709/200 |
| 2006/0161687 A1 | 7/2006 | Holt | |
| 2007/0242614 A1 * | 10/2007 | Buettner et al. ............ | 370/248 |
| 2009/0303898 A1 * | 12/2009 | Isenmann et al. ............ | 370/252 |

* cited by examiner

*Primary Examiner* — Ryan Stiglic
(74) *Attorney, Agent, or Firm* — Bacon & Thomas, PLLC

(57) ABSTRACT

A method for data exchange via a bus system, wherein an amount of data determined for data exchange is composed of a plurality of data packets, which data packets are to be transmitted in a predetermined sequence from a second participant of the bus system to a first participant of the bus system, wherein, for data exchange, a first data query is sent from the first participant to the second participant, and wherein, as a reply to the first data query, a first data packet is sent from the second participant to the first participant. Especially after the first participant has received the first data packet, a second data query is sent from the first participant to the second participant via the bus system, and as a reply to the second data query, a second data packet is sent from the second participant to the first participant. The second data packet is either the first data packet or a data packet following the first data packet in the predetermined sequence. The first and the second data query contains, in each case, a parameter with a first or a second parameter value, and in the case in which the parameter values of the first and second data query agree, the first data packet is sent, while, in the case in which the parameter values of the first and second data query differ, the data packet following the first data packet in the predetermined sequence is sent.

10 Claims, 4 Drawing Sheets

Fig. 3    (PRIOR ART)

METHOD FOR DATA EXCHANGE

TECHNICAL FIELD

The invention relates to a method for data exchange via a bus system, wherein a certain amount of data to be exchanged is composed of a plurality of data packets, and wherein the data packets are to be transmitted according to a predetermined sequence from a second participant of the bus system to a first participant of the bus system. Furthermore, the invention relates to a computer program product and to an apparatus for performing the method.

BACKGROUND DISCUSSION

Field devices which serve for registering and/or influencing process variables are often applied in process, as well as manufacturing, automation technology. For example, measuring devices for registering process variables serve as fill level measuring devices, flow measuring devices, pressure and temperature measuring devices, pH-measuring devices, conductivity measuring devices, etc., and register the corresponding process variables, fill level, flow, pressure, temperature, pH-value, conductivity, etc. For influencing process variables, actuators such as valves or pumps are used, by which the flow of a liquid in a pipeline or the fill level of a medium in a container can be changed. Devices which are applied near to the process and deliver or process information relevant to the process are all also referred to as field devices. In addition to the earlier named measuring devices/sensors and actuators, units which are directly connected to a field bus and serve for communication with the superordinated unit, such as e.g. remote I/Os, gateways, linking devices and wireless adapters, or radio adapters, are also generally referred to as field devices. A large number of such field devices are produced and sold by the Endress+Hauser Group.

In modern industrial plants, communication between at least one superordinated control unit and/or the field devices occurs as a rule via a bus system, such as PROFIBUS® PA, FOUNDATION FIELDBUS™ or HART®, for example. The bus systems can be both hardwired as well as wireless. The superordinated control unit serves for process control, process visualizing, process monitoring as well as for start-up and servicing of field devices. The registered measured values of the field devices, especially sensors, are transmitted via the particular bus system to a (or, in given cases, a number of) superordinated unit(s) and/or to other field devices.

Thus, in such a case, field devices as well as superordinated units function as participants of the bus system. The participants of the bus system have bus addresses for communication purposes; so that, for example, data in the form of addressed telegrams can be exchanged between the participants. Along with that, data transmission, especially for configuring and parametering field devices as well as for operating actuators, is also required. Accessing a parameter of a participant occurs via so-called write- and read-services, for example, by means of the Profibus-protocol. Thus, a parametering task, for example, is transmitted to a slave via the command "Write.req". The master sends the command "Read.req" in order to fetch a parameter value.

A method for data transmission between two participants of a communication system is known from German patent DE 102006054124 B4, wherein a data report is transmitted from the first participant to the second participant and the second participant sends an acknowledgement report back to the first participant, wherein both the data report as well as the acknowledgement report are checked.

A method for data transmission between two participants of a communication system is known from patent DE 102006054124 B4, wherein a data report is transmitted from the first participant to the second participant and the second participant sends an acknowledgement report back to the first participant, wherein both the data report as well as the acknowledgement report are checked.

A disadvantage of the above named methods is that relatively many resources, such as, for example, memory capacity, evaluating units, etc., are required, in order to perform a data transmission.

SUMMARY OF THE INVENTION

An object of the invention, therefore, is to provide a more efficient and simultaneously safer data exchange between participants of a bus system as compared to the state of the art.

The object is achieved as regards the method according to the invention in that for the purpose of the data exchange a first data query is sent from the first participant to the second participant; wherein as a reply to the first data query a first data packet is sent from the second participant to the first participant; wherein, especially after the first participant has received the first data packet, a second data query from the first participant is sent to the second participant via the bus system; wherein as a reply to the second data query a second data packet is sent from the second participant to the first participant; wherein the second data packet is either the first data packet or a data packet following the first data packet in a predetermined sequence of the data; wherein the first and the second data query, in each case, contains a parameter with a first or a second parameter value; wherein in the case of the parameter values of the first and second data query agreeing, the first data packet is sent; and wherein in the case of the parameter values of the first and second data query differing, the data packet following the first data packet is sent in accordance with the predetermined sequence.

It is thus proposed to perform the transmission of the data packets based on at least one parameter, which can assume preferably at least two different parameter values, especially preferably exactly two different parameter values. On the other hand, a parameter can also be used which can assume more than two parameter values, of which, however, only two parameter values are used in order to perform the data transmission. The first or second parameter value can then be transmitted together with a data query, especially in the same telegram as the data query. For determining the next data packet to be transferred, corresponding especially to the predetermined sequence, the parameter values of two data queries following one another can then be compared with one another, and based on the comparison the next data packet to be transferred is made available, i.e. transmitted to the first participant. Through the parameter values used, which, for example, are transmitted together with a data query to the second participant, especially also on the part of the second participant it can be assured that the last transferred data packet was transmitted completely and/or faultlessly to the first participant. Especially, the last data packet sent can be dispatched anew in a simple manner, without a large effort as regards addressing, reviewing the data packets, etc. A further advantage of the proposed method is that, indeed, for example, the device description and the firmware, e.g. of a field device, must be adapted for performing the method; however, the present protocols, programs and/or programming environments need not be changed. Also in the case of a failed data transmission or in the case where the one and the same data packet is transmitted a number of times, an error report is output, or a corresponding report displayed to a user.

As initially mentioned, the bus system can, in such case, be a hardwired or a wireless network. The participants of the bus system preferably have, additionally, in each case, at least one communication interface which serves for data transmission via the bus system or for communication with other participants of the bus system. Quite generally in such a case, a unit which has an address available, via which the data can be addressed and transmitted to the unit, can be understood to be a participant of a bus system. Especially preferably, if the bus system is a Profibus bus system, i.e. a bus system wherein the Profibus protocol is used for data transmission. The bus system can, however, also be, for example, a bus system selected from bus systems known from the state of the art, such as, for example, a Foundation Fieldbus bus system, etc. On the other hand, however, it can be a device-internal bus system, i.e. a data bus, in the case of which different modules of a device act as participants of a bus system.

In an embodiment of the method, the parameter can only assume the first or the second parameter value and is used for performing, especially for checking, the data exchange. Since only two parameter values are used, a resource conserving data transmission can occur, especially one with a small memory requirement in comparison to the known state of the art methods.

In an additional embodiment of the method, the amount of data to be exchanged is divided into data packets and the data packets are transmitted from the second participant to the first participant corresponding to a predetermined sequence. Since the data packets are transmitted, for example, in the form of telegrams to the first participant and, depending on the protocol applied, only a limited data capacity is available in a telegram, it is required to subdivide the amount of data into a number of data packets, in the case of a data transmission via a bus system. Furthermore, it is required that these data packets be transmitted according to a predetermined sequence, in order that they can be reassembled by the receiver, here the first participant. In this way, the complete serial transmission of the amount of data, and, respectively, the data packets, can be assured.

In an additional embodiment of the method, data packets that are part of an amount of data to be transmitted from the second participant to the first participant are, at least at times, stored in the second participant, especially in a memory unit of the second participant. The amount of data can be, for example, process relevant data, for example, measurement data recorded by a field device, especially a measuring device. This data can be transmitted to another participant of the bus system, for example here the first participant, for evaluating, further processing or reprocessing purposes, for example, in order to calculate an envelope curve of the recorded measurement data and/or to display the data to a user.

In an additional embodiment of the method, the data packets are numbered, and the sequence in which the data packets are to be transmitted to the first participant is fixed as a function of the data queries and the transmitted parameter values. Accordingly, a reference number or other characteristic variable can be assigned to the data packets, so that a position of a data packet in a sequence of data packets can be specified. The numbering can be stored, for example, in the creation of the data packets, especially also in the data packets themselves. On the basis of this numbering, the sequence in which the data packets are transmitted, or are to be transmitted, can be fixed. As already mentioned, in the case of an error in the data transmission via the bus system, two data queries following one another are transmitted, for example, with the same parameter value. This has the result that the last transmitted data packet based on the undertaken numbering is selected and can be sent anew.

In an additional embodiment of the method, the second participant includes a counter, wherein after the receipt of two data queries and the corresponding parameter values arriving one after the other, the counter is changed, especially increased or lowered when the data queries include different parameter values; and the counter remains unchanged when the data queries include the same parameter value. In relationship with the numbering of the data packets, a counter which displays the data packet to be sent can thus be provided. Thus, for example, the data packet whose numbering agrees with the current value of the counter can be sent, or can be provided for the transmission. The counter can also be a pointer which contains a particular memory address and addresses a data packet as the next to be transferred, especially after the receipt of a data query. The counter can then be changed, for example, incremented or decremented, or remain unchanged, as a function of the parameter values sent together with a data query and so display the data packet as the next to be sent upon a data query from the first participant.

In an additional embodiment of the method, there is a relationship between the value of the counter and the numbering of the data packets and, upon a data query, the data packet corresponding to the currently valid value of the counter is transmitted.

In an additional embodiment of the method, the integrity of the received data packet is checked by the first participant and either the first or the second parameter value is transmitted with the following data query as a function of the result of the review. The parameter value, which is transmitted together with a data query, is ascertained in this embodiment through the review of the data packet received by the first participant. During transmission via a physical medium such as cable lines, for example, the data packets sent from the second participant and received by the first participant are subject to, above all, electromagnetic disturbing influences which can corrupt the data, for example in the form of digital bits. For example, the integrity of the data packet received by the first participant can be checked by means of a checksum. The second participant accordingly requires no evaluation unit or redundant data channel, by means of which the transmission of a sent data packet is checked or assured.

With reference to the computer program product, the object is achieved in that an executable program code is provided, wherein a method for data exchange according to at least one of the preceding embodiments is performed when the program code is executed. The program code can be stored for this in a computer readable memory unit.

With respect to the apparatus, the object is achieved by providing corresponding resources for performing the method according to at least one of the preceding embodiments. The apparatus can comprise, for example, a first and a second participant, which are connected with one another via a bus system. Additionally, both the first as well as the second participant can have a computing unit available, which serves to perform the method steps. Especially, the computing unit connected to the first participant can be connected with a first communication interface, where the communication interface serves to transmit the data queries via the bus system. In the same way, the computing unit connected to the second participant can be connected with a second communication interface, where the communication interface serves to transmit the data queries via the bus system

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
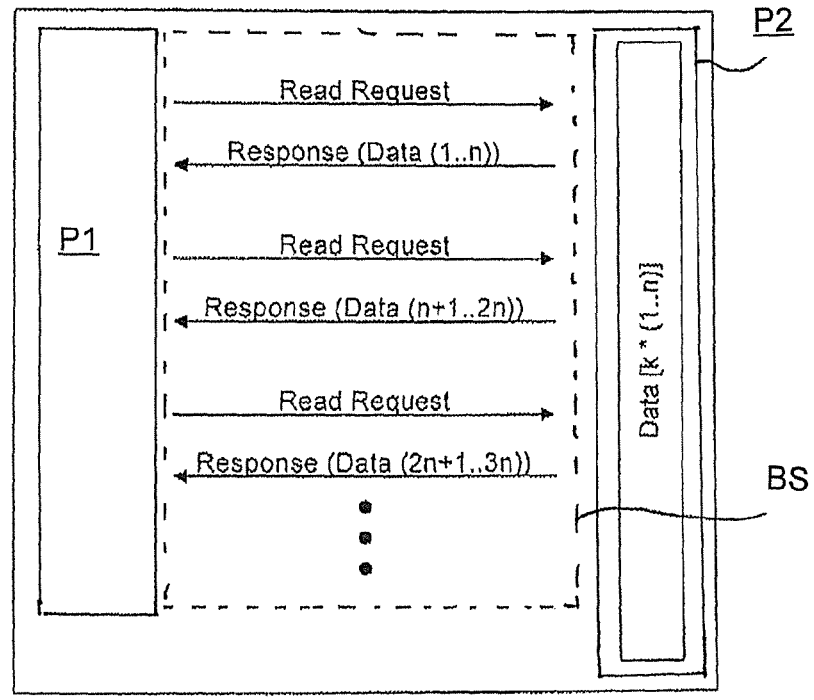
FIG. 1 is a simplified flow diagram in the case of a data transmission according to a state of the art method.

FIG. 1 shows a flow diagram according to a method known from the state of the art. The amount of data to be transmitted is divided into k data packets which comprise n bits in each case, wherein k and n are integers. Accordingly, the amount of data altogether comprises k·n bits which are to be transmitted to the first participant. For accessing the data packets, the first participant P1 sends a first data query "Read Request" to the second participant P2, which answers the data query with a first data packet "(Data (1 . . . n))" which contains bits 1 through n of the amount of data to be transferred. The first data packet is transmitted in the form of a telegram "Response (Data (1 . . . n))". After obtaining the first data packet "(Data (1 . . . n))", the first participant sends a second data query "Read Request" to the second participant P2. The second participant P2 answers with the transmission of a second data packet "(Data (n+1 . . . 2n))", which contains bits n+1 through 2n of the amount of data. Also the second data packet is transmitted in the form of a telegram "Response (Data (n+1 . . . 2n))" in such a case. The same data query "Read Request" is always used in such a case. The first participant can be, for example, a master, which reads a Record Parameter by means of the "Read Request". The Record Parameter automatically contains a new data packet with each read operation. The disadvantage of this method lies in the fact that data or data packets lost in the transmission are not detected.

Figure 2:
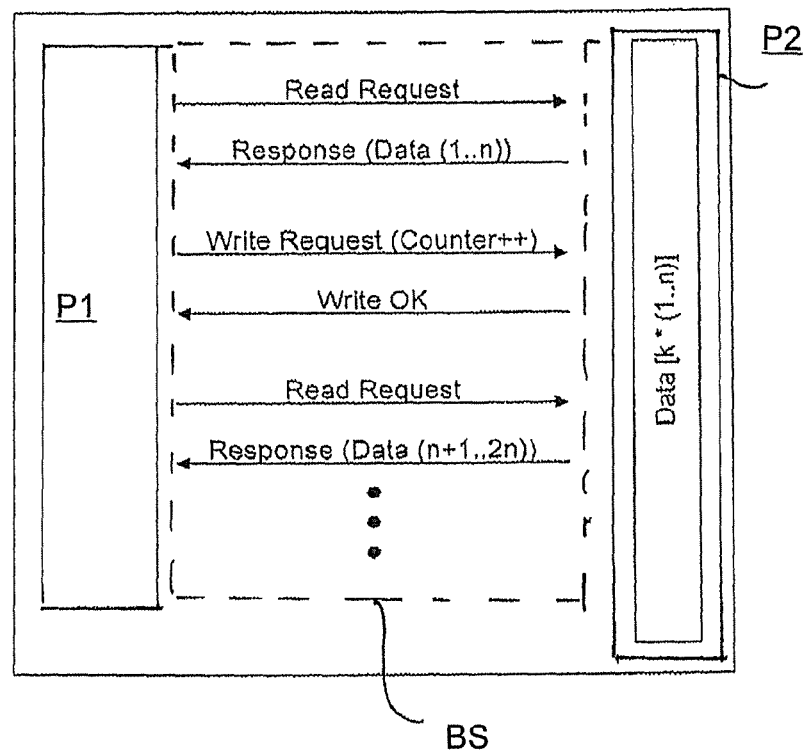
FIG. 2 is a simplified flow diagram in the case of a data transmission according to another state of the art method.

FIG. 2 shows a flow diagram of an additional method known from the state of the art. Alternatively to the method shown in FIG. 1, a master can specify a second parameter, which serves as an index. In such a case, with the parameter "Write Request", a counter is increased by the command "Counter++". The counter therefor is accommodated in the second participant P2. Lost data/data packets can thus be requested repeatedly through a new "Read Request". If the next data packet is transmitted, a "Write Request" is transmitted between two "Read Request" data queries to the second participant. However, the non-productive, since time consuming, transmission is disadvantageous in such a case, since two parameter accessings, i.e. first a writing and then a reading, occur. In some bus systems BS, applied protocols, such as HART, for example, can simultaneously transmit data, such as, for example, a counter "Counter++" command along with the read request, i.e. along with the "Read Request" telegram. However, in the case of the Profibus protocol, for example, this opportunity does not exist.

Figure 3:
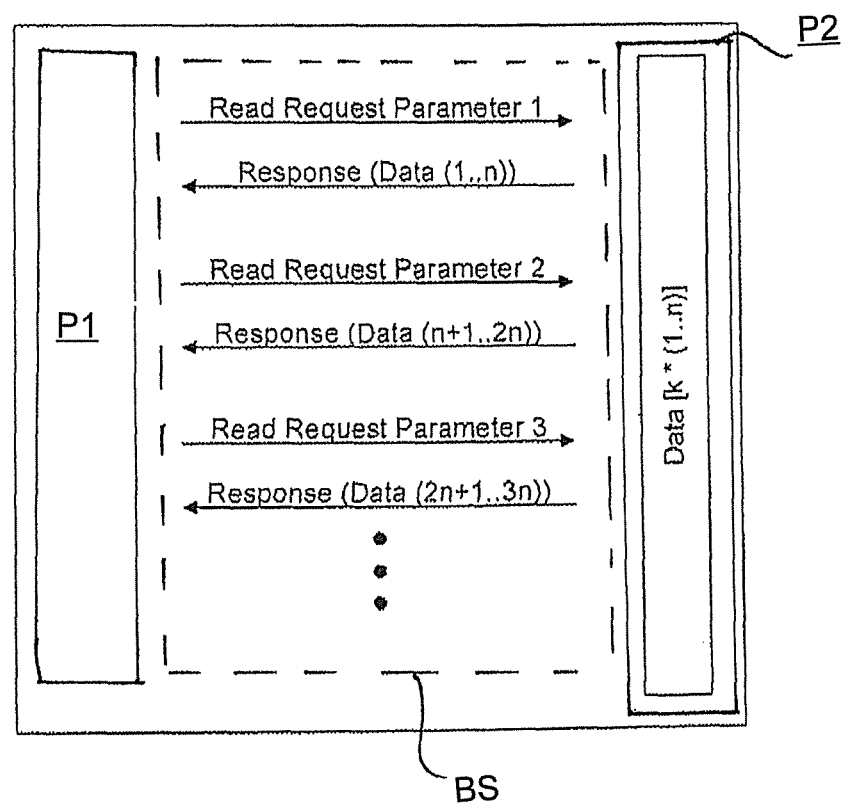
FIG. 3 is a simplified flow diagram in the case of a data transmission according to yet another state of the art method.

Also FIG. 3 shows schematically another method for data transmission known from the state of the art. If the amount of data is always the same and not very large, the opportunity exists to access each data packet via a parameter value of its own. The first data packet "(Data 1 . . . n)" with the first n bits is then accessed through the data query "Read Request" with the first parameter value "Parameter 1", the second n bits through the second data query "Read Request" with the second parameter value "Parameter 2," etc. However, with larger data amounts this method is impractical, since then a large number of parameter values must be used.

Figure 4:
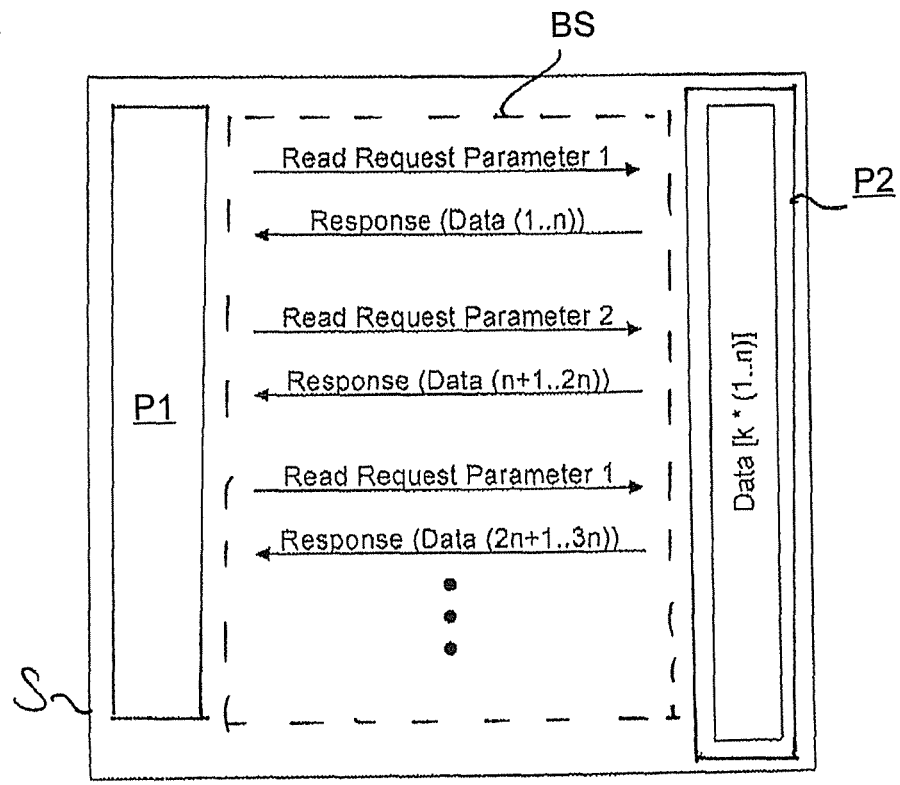
FIG. 4 is a schematic flow diagram in the case of a data transmission according to an embodiment of the proposed invention.

FIG. 4 shows a flow diagram according to an embodiment of the invention. The amount of data to be transmitted is divided into a number of equally large data packets k. However, the data packets can also be of different sizes, i.e. contain different numbers of bits. In the example of an embodiment shown in FIG. 4, a data packet comprises n bits. The amount of data, or the data packets, can be present, in such a case, in one or more memory units, such as a data buffer of the second participant, for example.

Telegrams are usually exchanged between the first and the second participants for a data exchange. The telegrams, depending on the protocol applied, are subdivided into different sequences, which serve different purposes. One sequence can serve, for example, to identify the telegram type. For example, in the already mentioned, Profibus protocol, "Read.req", "Read.res", "Write.req" telegrams etc. are here to be understood as telegram types. The transmission of a certain amount of data can be required when e.g. a user of an operating tool invokes a function that requires the data of another participant of the bus system. Since only a limited data capacity for data transmission is usually available in a telegram, the amount of data must in given cases be divided into a number of data packets. A data exchange usually begins then with a data query, i.e. a "Read Request". The data query is transmitted from the first participant P1 to the second participant P2 and contains a first parameter with a predetermined parameter value "Parameter 1". The parameter value can be, for example, a memory address internal to the device, an index or slot.

The second participant P2 transmits the first n bits of the amount of data in the form of a data packet "(Data (1 . . . n))" as a reply to the first data query "read request Parameter1". These bits are transmitted to the first participant P1 by means of a "Response" telegram. The data packet "Data (1 . . . n)" is then checked by the first participant P1. If the data packet is successfully transmitted to the first participant P1, i.e. without a loss of integrity, then the data exchange can be continued and a second data packet can be transmitted. The first participant then sends a second data query "Read Request" with a parameter that includes the second parameter value "Parameter 2", which differs from the first parameter value "Parameter 1.". The second parameter value "Parameter 2" can also be an address of a memory region. The parameter values can alternatively be a slot or index of the second participant.

As a reply to this second data query "Read Request" with the second parameter value "Parameter 2," the second participant P2 transmits the bits n+1 through 2n in a second data packet "Data (n+1 . . . 2n)" to the first participant. The first participant P1 also checks this second data packet received, in that a corresponding checksum is formed, for example. If the transmission of the second data packet was successful, then the first participant P1 sends a further, third data query "Read Request Parameter 1" to the second participant P2. This third data query now contains the first parameter value "Parameter 1" again. After the receipt of the third data query, the second participant then transmits bits 2n+1 through 3n in a third data packet "Data (2n+1 . . . 3n)" to the first participant. In this way and manner, the data transmission can be continued until all data packets belonging to the amount of data have been transmitted.

Figure 5:
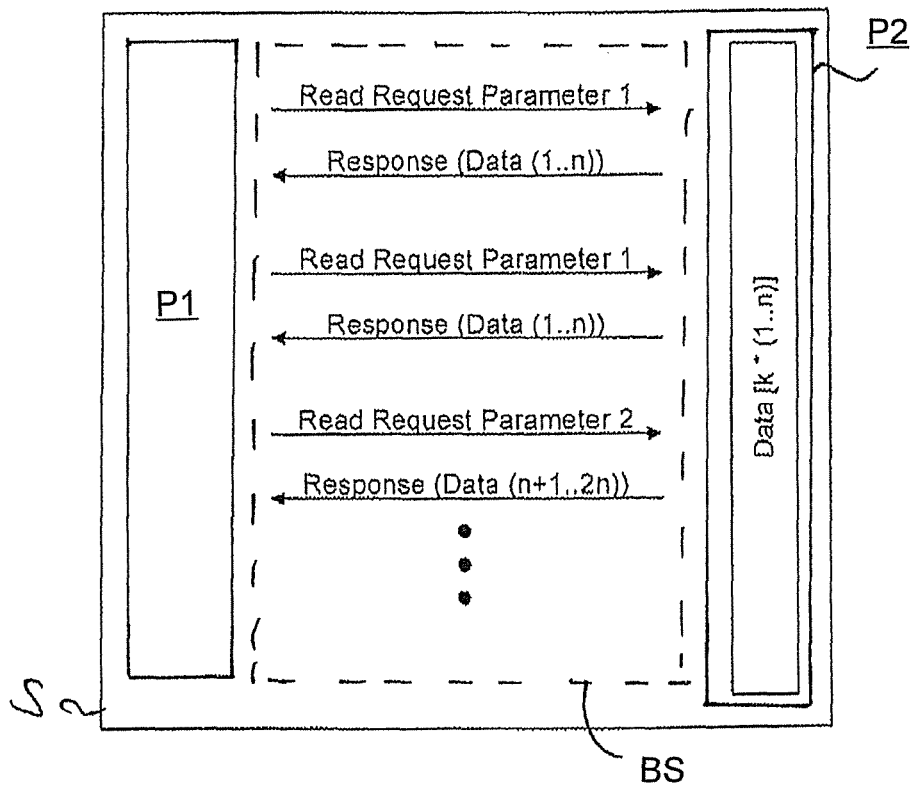
FIG. 5 is a schematic flow diagram in the case of a data transmission according to an additional embodiment of the proposed invention.

The case of a data packet not being transmitted, or not being transmitted completely, but instead defectively, is presented in FIG. 5. Here, the data transmission also begins with a data query in the form of a telegram. However, an error arises during the transmission, so that the first data packet is transmitted imperfectly to the first participant. The error is detected through a review of the first data packet by the first participant P1. Thereupon a second data query is sent to the second participant P2, which contains the first parameter value "Parameter 1" now as in the preceding first data query. Then the second participant P2 transmits anew the data contained in the preceding data packet, i.e. the bits 1 through n. If the data transmission of the bits 1 through n is successful, then the first participant P1 sends a data query which contains the second parameter value "Parameter 2". Thereupon the second participant P2 sends the data packet established corresponding to the predetermined sequence of data packets determined for the transmission.

Figure 6:
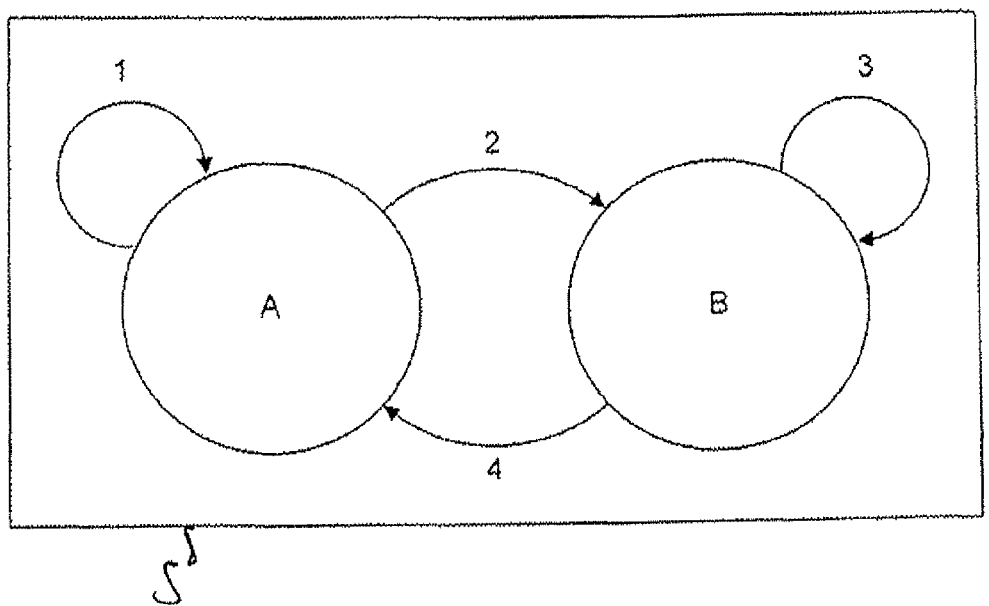
FIG. 6 is a schematic state diagram of data flow in the case of a data transmission according to an embodiment of the proposed invention.

FIG. 6 shows a state diagram that, based on states and state transitions, reflects the method steps, and, respectively, the flow control, of a program implementing the method.

State transition 1: The system S is in state "A". A read request according to "Parameter 1" is submitted, which is answered with a data packet m. The system S remains in state "A"; and each further read request per "Parameter 1" is answered with the same data packet m. The introduced ordinal number m is a natural number in such a case. By means of the ordinal number, for example, the data packets to be transmitted can be identified by associating, for example, a data packet with an ordinal number.

State transition 2: The system S is in state "A". A read request with "Parameter 2" is present, which is answered with the next data packet l=m+1. The system S transfers to state "B".

State transition 3: The system S is in state "B". A read request with "Parameter 2" is present, which is answered with the same data packet l as from state transition 2. The system S remains in the state "B"; and each further read request for "Parameter 2" is answered with the same data packet l.

State transition 4: The system S is in state "B". A read request for "Parameter 1" is present, which is answered with the next data packet m=l+1. The system S transfers to state "A".

LIST OF REFERENCE CHARACTERS

P1 first participant
P2 second participant
BS bus system
S system
1 state transition 1
2 state transition 2
3 state transition 3
4 state transition 4
A state A
B state B

The invention claimed is:

1. A method for data exchange via a bus system, having a first participant and a second participant, wherein an amount of data determined for data exchange is composed of a plurality of data packets, comprising the steps of:

transmitting data packets in a predetermined sequence from the second participant of the bus system to the first participant of the bus system;

sending, for data exchange, a first data query from the first participant to the second participant;

sending, as a reply to the first data query, a first data packet from the second participant to the first participant;

especially after the first participant has received the first data packet, a second data query is sent from the first participant to the second participant via the bus system; and as a reply to the second data query, a second data packet is sent from the second participant to the first participant, wherein:

the second data packet is either the first data packet or a data packet following the first data packet in the predetermined sequence;

the first and the second data query contains, in each case, a parameter with a first or a second parameter value; and in the case in which the parameter values of the first and second data query agree, the first data packet is sent, while, in the case in which the parameter values of the first and second data query differ, the data packet following the first data packet in the predetermined sequence is sent.

2. Method as claimed in claim 1, wherein:
the parameter can assume only the first or the second parameter value and is applied for performing, especially for checking, the data exchange.

3. The method as claimed in claim 1, wherein:
the amount of data to be exchanged is divided into data packets and the data packets are transmitted corresponding to a predetermined sequence from the second participant to the first participant.

4. The method as claimed in claim 1, wherein:
the data packets, which are stored at least at times in the second participant, especially a memory unit of the second participant, are part of an amount of data to be transmitted from the second participant to the first participant.

5. The method as claimed in claim 1, wherein:
the data packets are numbered; and
the sequence in which the data packets are transmitted to the first participant is established as a function of the data queries and the transmitted parameter values.

6. The method as claimed in claim 1, wherein:
the second participant includes a counter;
after receipt of two data queries and corresponding parameters arriving one after the other, the counter is changed, especially increased or lowered, when the data queries include different parameters; and
the counter remains unchanged, when the data queries include the same parameter.

7. The method as claimed in claim 6, wherein:
there is a relationship between the value of the counter and the numbering of the data packets; and,
upon a data query, the data packet corresponding to the currently valid value of the counter is transmitted.

8. The method as claimed in claim 1, wherein:
the integrity of the received data packet is checked by the first participant and either the first or the second parameter value is transmitted with the following data query as a function of the result of the review.

9. A non-transitory computer program product with executable program code, wherein a method for data exchange as claimed in claim 1 is performed, when the program code is executed.

10. An apparatus for performing the method as claimed in claim 1.

* * * * *